US008218493B2

(12) United States Patent
Mishra et al.

(10) Patent No.: US 8,218,493 B2
(45) Date of Patent: Jul. 10, 2012

(54) SYSTEM AND METHOD FOR INTERFERENCE MITIGATION IN WIRELESS NETWORKS

(75) Inventors: Arunesh Mishra, Mountain View, CA (US); Suman Banerjee, Madison, WI (US); Vivek Shrivastava, Madison, WI (US); Shravan Rayanchu, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 380 days.

(21) Appl. No.: 12/555,452

(22) Filed: Sep. 8, 2009

(65) Prior Publication Data

US 2010/0080183 A1    Apr. 1, 2010

Related U.S. Application Data

(60) Provisional application No. 61/097,406, filed on Sep. 16, 2008, provisional application No. 61/095,216, filed on Sep. 8, 2008.

(51) Int. Cl.
*H04W 72/12* (2009.01)
(52) U.S. Cl. ........................................... 370/329
(58) Field of Classification Search ............ 370/310, 370/328, 329, 338, 342, 431, 445, 447
See application file for complete search history.

(56) References Cited

U.S. PATENT DOCUMENTS

| | | | | |
|---|---|---|---|---|
| 7,184,407 | B1* | 2/2007 | Myles et al. | 370/242 |
| 7,616,655 | B2* | 11/2009 | Benveniste | 370/447 |
| 7,801,096 | B2* | 9/2010 | Myles et al. | 370/338 |
| 7,924,864 | B2* | 4/2011 | Le et al. | 370/431 |
| 8,014,325 | B2* | 9/2011 | Izumikawa et al. | 370/310 |
| 2004/0203474 | A1* | 10/2004 | Miller et al. | 455/69 |
| 2008/0095137 | A1* | 4/2008 | Levy et al. | 370/342 |
| 2008/0316958 | A1* | 12/2008 | Casone et al. | 370/329 |
| 2009/0225682 | A1* | 9/2009 | Grote-Lopez et al. | 370/255 |

OTHER PUBLICATIONS

Beherano, Yigal, et al., MiFi: A Framework for Fairness and QoS Assurance in Current IEEE 802.11 Networks with Multiple Access Points, IEEE INFOCOM 2004, IEEE, New York, New York, USA.
Andrews, Matthew, A Survey of Scheduling Theory in Wireless Data Networks, Proceedings of the 2005 IMA summer workshop on wireless communications, pp. 1-16, Institute for Mathematics and Its Applications, Minneapolis, MN, USA.

* cited by examiner

*Primary Examiner* — Chi Pham
*Assistant Examiner* — Robert Lopata
(74) *Attorney, Agent, or Firm* — Boyle Fredrickson, S.C.

(57) ABSTRACT

A computer-implemented method for scheduling a packet for transmission in a wireless local area network can be used to account for hidden and/or exposed terminals. The method includes determining whether the packet is to be transmitted to a computing device through a wireless access point that is in conflict with at least one other computing device associated with a different access point. The method further includes determining whether there is a conflicting packet scheduled to be transmitted for any conflicting computing devices associated with a different access points and scheduling the packet for transmission based on any conflicting packets. The method yet further includes forwarding the packet to a wireless access point at the scheduled time.

19 Claims, 6 Drawing Sheets

SYSTEM AND METHOD FOR INTERFERENCE MITIGATION IN WIRELESS NETWORKS

CROSS-REFERENCE TO RELATED APPLICATIONS

This application claims the benefit of U.S. Provisional Application No. 61/095,216 filed Sep. 8, 2008 and U.S. Provisional Application No. 61/097,406, filed Sep. 16, 2008, hereby incorporated by reference in its entirety.

STATEMENT REGARDING FEDERALLY SPONSORED RESEARCH OR DEVELOPMENT

This invention was made with United States government support awarded by the following agencies:
NSF 0520152 and 0639434
The United States government has certain rights in this invention.

BACKGROUND

Wireless local area networks (WLAN) are increasingly utilized by organizations to provide connectivity to users. As usage increases, the number of users, the number of wireless access points, the amount of traffic, etc. all increase to the point where maximizing throughput, the amount of data that can be delivered during any given time, becomes increasingly important. However, given the dynamic nature of wireless networks, such as users moving around using mobile computing devices, users dropping in to and out of the network, etc., conflicts increasingly occur. When an access point attempts to transmit on a data channel, the channel may already be in use by another access point, creating the conflict. Generally, a "channel" describes an encoding of data for wireless transmission, such as by frequency, the permits simultaneous transmission without interference with data on other channels.

One common method for handling conflicts during transmission of wireless packet is the distributed coordination function (DCF) technique. DCF uses an algorithm at each wireless access point (WAP) to listen to the channel to determine if the channel is busy. If the channel is not busy, the WAP begins transmission. If the channel is busy, the WAP defers its transmission by a randomly generated backoff time and then attempts transmission again. This method has proven to be highly efficient in the general case at maximizing throughput for WLANs. However, DCF does not perform optimally for network that have hidden and/or exposed terminals.

A hidden terminal may be a first wireless access point that is in communication with a computing device, but is out of range of other wireless access points in communication with the computing device. Accordingly, the first wireless access point may begin transmitting, but such transmissions are not detectable by the other wireless access points such that any of the other wireless access points may simultaneously attempt to transmit causing overlapping transmissions. The problem increases significantly when networks include a large numbers of wireless access points and associated computing devices, when networks are heavily utilized, etc. as often occurs with increasing usage of mobile computing devices, etc.

An exposed terminal is a first wireless access point that is blocked from sending packets to a first computing device because of a neighboring wireless access point. In this situation the neighboring wireless access point may be transmitting to a neighbor computing device. The first computing device may be out of range of the neighboring wireless access point and the neighbor computing device may be out of range of the first wireless access point. However, if the first wireless access point is within range of the neighboring wireless access point, the transmission can be sensed by the first wireless access point and the first wireless access point will not transmit even though the transmission by both wireless access points would not create conflicts.

What is needed is a system and method for improving wireless network throughput in a network having exposed and hidden terminals.

SUMMARY OF THE INVENTION

The present application is directed to a centralized scheduling system and method utilizing distributed coordination function for the majority of data packets and using centralized scheduling for instance of detected exposed and hidden terminals. To further increase throughput, the centralized scheduling is performed using speculative scheduling based on known characteristics of the network. The centralized scheduling may also maximize throughput using epoch based transmittals wherein groups of packets are transmitted within defined time periods (epochs).

The present application describes a computer-implemented method for scheduling a packet for transmission in a wireless local area network that can be used to account for hidden and/or exposed terminals. The method includes determining whether the packet is to be transmitted to a computing device through a wireless access point that is in conflict with at least one other computing device associated with a different access point. The method further includes determining whether there is a conflicting packet scheduled to be transmitted for any conflicting computing devices associated with a different access points and scheduling the packet for transmission based on any conflicting packets. The method yet further includes forwarding the packet to a wireless access point at the scheduled time.

These particular objects and advantages may apply to only some embodiments falling within the claims, and thus do not define the scope of the invention.

DETAILED DESCRIPTION OF THE PREFERRED EMBODIMENT

The present invention broadly discloses a centralized scheduling controller configured to identify exposed and hidden terminals. In one embodiment, the invention uses a conflict graph to schedule packets for transmission based on the conflict graph and a centralized scheduling algorithm. Advantageously, the conflict graph allows the centralized scheduling controller to use DCF scheduling for data transmission not involving detected hidden and/or exposed terminals and centralized scheduling for data transmissions involving hidden and/or exposed terminals, increasing the data throughput on the wireless network.

Figure 1:
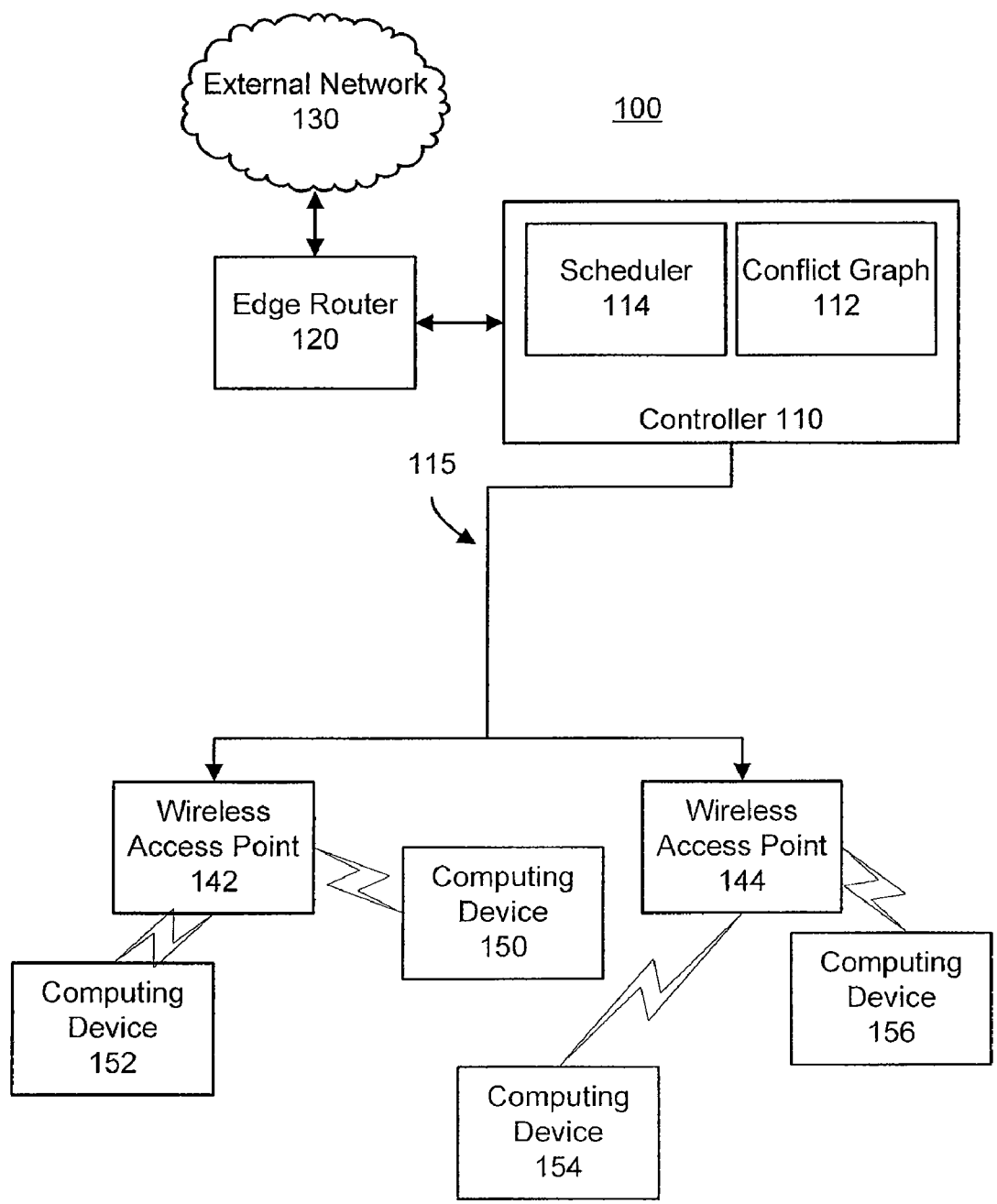
FIG. 1 is a graphical representation of a wireless local area network having exposed and hidden terminals including a centralized scheduling controller.

Referring now to FIG. 1, a graphical representation of a wireless local area network 100 having exposed and hidden terminals and including a centralized scheduling controller 110 is shown, according to an exemplary embodiment. Network 100 includes a centralized scheduling controller 110 connected to an external network 130 through an edge router 120. Controller 110 is configured to receive data from external network 130 for transmission through a wired network 115 to wireless access points 142 and 144. Wireless access points 142 and 144 are configured transmit the data wirelessly to computing devices 150-156.

In further detail, centralized scheduling controller 110 is configured to receive downlink data, i.e., data packets intended to be wirelessly transmitted to computing devices using wireless access points 140-144, from external network 130 through edge router 120. Controller 110 is configured, for each channel, and for each received packet destined to a computing device associated with that channel, which wireless access point should send a packet, and when. According to an exemplary embodiment, centralized controller 110 may be implemented as a component within router 120. Alternatively, as shown, controller 110 may be a stand alone computing system. Controller 110 implements a centralized control function to reduce the negative effect on data throughput caused by hidden and/or exposed terminals as further described hereinbelow.

Centralized controller 110 is configured to perform centralized scheduling using a conflict graph 112 to identify detected hidden and/or exposed terminals within network 100 and a scheduling algorithm 114 configured to optimize data throughput. Conflict graph 112 is a data structure that identifies all pairs of links with network 10 that interfere with each other as described in further detail below with reference to FIG. 3. Scheduling algorithm 114 may be a scheduling function configured to optimize throughput while avoiding conflicts based on the information in conflict graph 112 as described in further detail below with reference to FIG. 4. Controller 110 is further configured to allow normal transmission, where access points will utilize the distributed coordination function to resolve conflicts, for those computing devices and access points that do not have known hidden and/or exposed terminals.

Edge router 120 is a networking device configured to receive and forward all data packets between network 100 and external network 130. External network 130 may be any external network, although in the general case external network 130 is the Internet. Edge router 120 is typically configured to implement centralized control plane mechanisms, such as access control, channel selection, setting transmit power levels, etc. However, edge routers have typically not been used to perform centralized data plane mechanisms, such as channel contention and access point transmission contention where conflicts arise. These data plane mechanisms have typically been performed using DCF as described above.

Wireless access points 142 and 144 are network devices that allow computing devices 150-156 to communicate wirelessly using a variety of communication standards, such as WiFi (802.11), Bluetooth, etc. Wireless access points 142 and 144 are further connected to wired network 115 to relay data between the computing devices 150-156, other access points, external network 130, etc. Computing devices 150-156 are typically configured to use a carrier sense/multiple access algorithm to detect if any other device within range is transmitting prior to beginning their own transmission. If any other device is transmitting, the first device will "back off", i.e. wait for an amount of time, before attempting their transmission again.

In operation, a conflict can occur when a device is transmitting and/or receiving on the same channel at the same time as any other device and the two devices are within range of each other. To ensure that the transmitted data is properly transmitted or received, without need for retransmission, system 100 should seek to minimize conflicts, i.e. multiple devices attempting to transmit simultaneously on the same channel and within range. Multiple transmissions can be made where devices are out of range of one another such that the devices will not interfere with one another. However, with mobile computing device that frequently move into and out of transmitting range with various other components of network 100 and densely packed access points that may interfere with each other's transmissions, potential for conflicts will often occur.

Figure 2A:
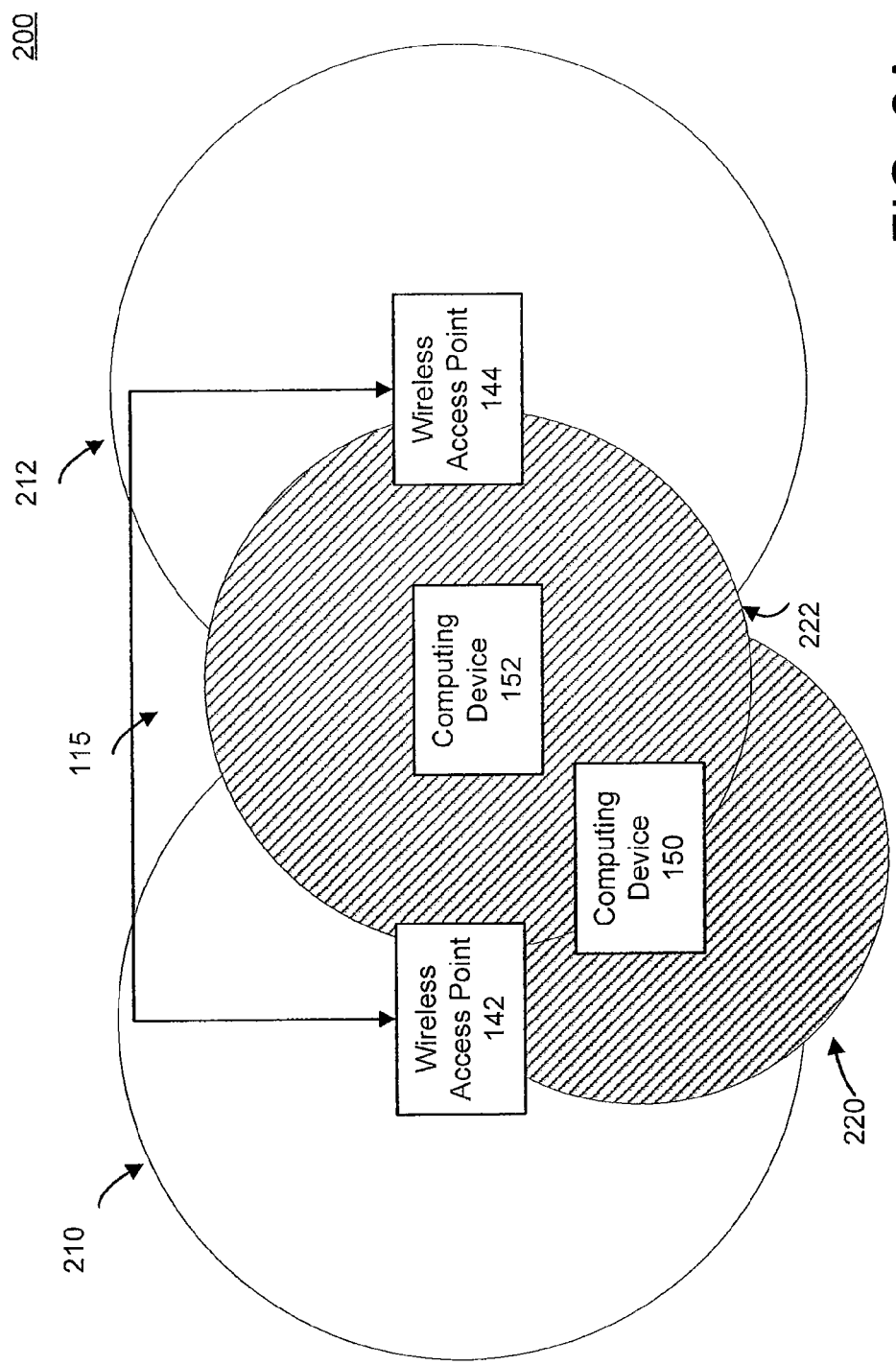
FIG. 2A is a transmission range map for a configuration of devices for the network of FIG. 1 having hidden terminals.

Referring now to FIG. 2A, a transmission range map 200 for an embodiment of network 100 having hidden terminals is shown, according to an exemplary embodiment. Map 200 includes transmission ranges 210 and 212 for wireless access points 142 and 144, respectively. Representation 200 further depicts transmission ranges 220 and 222 for each of computing devices 150 and 152, respectively. Critically, In the case of hidden terminals, transmission ranges 210 and 212 do not overlap. Accordingly, wireless access point 142 cannot detect transmission by wireless access point 144.

In the configuration shown in FIG. 2A, computing devices 150 and 152 may be within range of one or more of the access points 140 and 142 and be components of the network 100. In the depicted example, computing devices 150 is only within range of wireless access point 142 and can send and receive data through wired network 115 using wireless access point 142. Computing devices may be within range of multiple access points. In this example, computing device 152 is within range of both wireless access point 142 and wireless access point 144. However, each computing device will be associated a single access point.

In a wireless network, for downlink traffic, i.e. packets sent to computing devices from the wireless access points, computing devices will usually be associated with the wireless access point providing the strongest signal. This rule addresses devices within range of multiple access points, as shown by computing device 152 within range of both wireless access point 142 and wireless access point 144. In this example, computing device 152 is within range of wireless access point 142 but associated with wireless access point 144 based on signal strength. If wireless access point 144 cannot sense wireless access point 142, wireless access point 144 may be a hidden terminal for computing device 152.

As the number of hidden terminals increases, the number of instances where collisions occur, requiring retransmission and the degree of backing off that is required increases significantly. Continual backoffs of lengthening duration has a negative effect on the data throughput of the network 100.

Figure 2B:
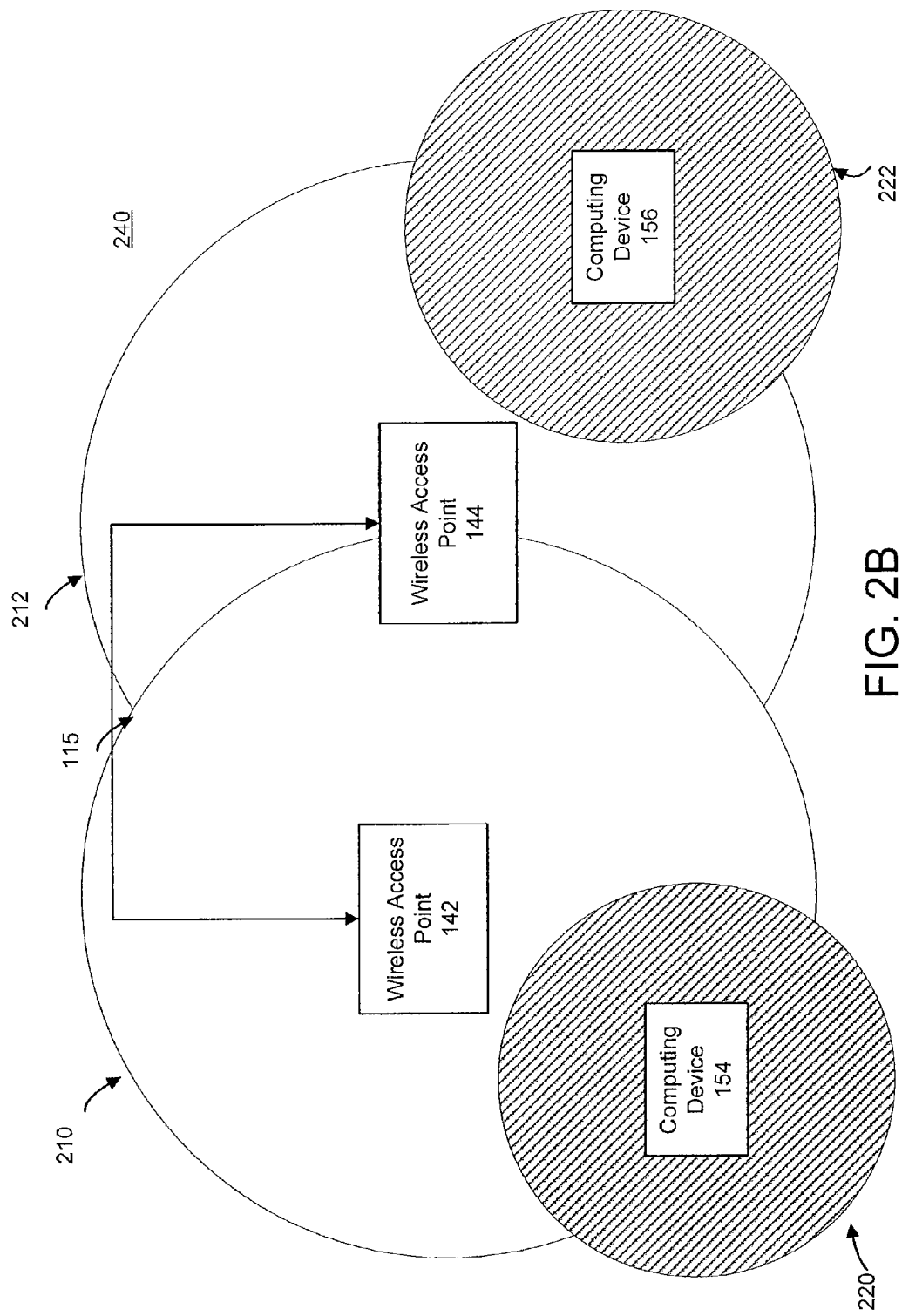
FIG. 2B is a transmission range map for a configuration of devices for the network of FIG. 1 having exposed terminals.

Referring now to FIG. 2B, a transmission range map 240 of a configuration of devices for network 100 having exposed terminals is shown. Representation 240 illustrates a situation in which either of wireless access point 142 and wireless access point 144 may become an exposed terminal. An exposed terminal is a wireless access point that is prevented from transmitting to a computing device because of a neighboring wireless access point even though there is no actual interference. In FIG. 2B, wireless access point 144 is within range of wireless access point 142 such that wireless access point 144 can detect when wireless access point 142 is transmitting. To prevent conflicts, wireless access point 144 will not transmit while wireless access point 142 is transmitting.

However, computing devices 154 and 156 are only within range of one of the wireless access points, wireless access point 142 and 144, respectively. Accordingly, computing devices 154 and 156 may be simultaneously receiving data without causing conflicts. Data throughput for network 100 can be increased by allowing wireless access point 142 to send data packets to computing device 154 simultaneously with wireless access point 144 sending packets to computing device 156.

Controller 110 may be utilized to implement centralized scheduling. Centralized scheduling minimizes conflicts caused by hidden terminal and takes advantage of exposed terminals to maximize data throughput. However, centralized scheduling requires acknowledgements from wireless access points 142 and 144 that a packet has been sent successfully. Acknowledging the transmission of scheduled packets and other data associated with the centralized controller can significantly increase the amount of overhead on wired network 115, reducing data throughput and decreasing the benefit of centralized scheduling. Accordingly, controller 110 is configured to only provide centralized scheduling for those data packets, wireless access points, and computing devices where potential exists for conflicts as described with reference to FIGS. 2A and 2B.

Figure 3:
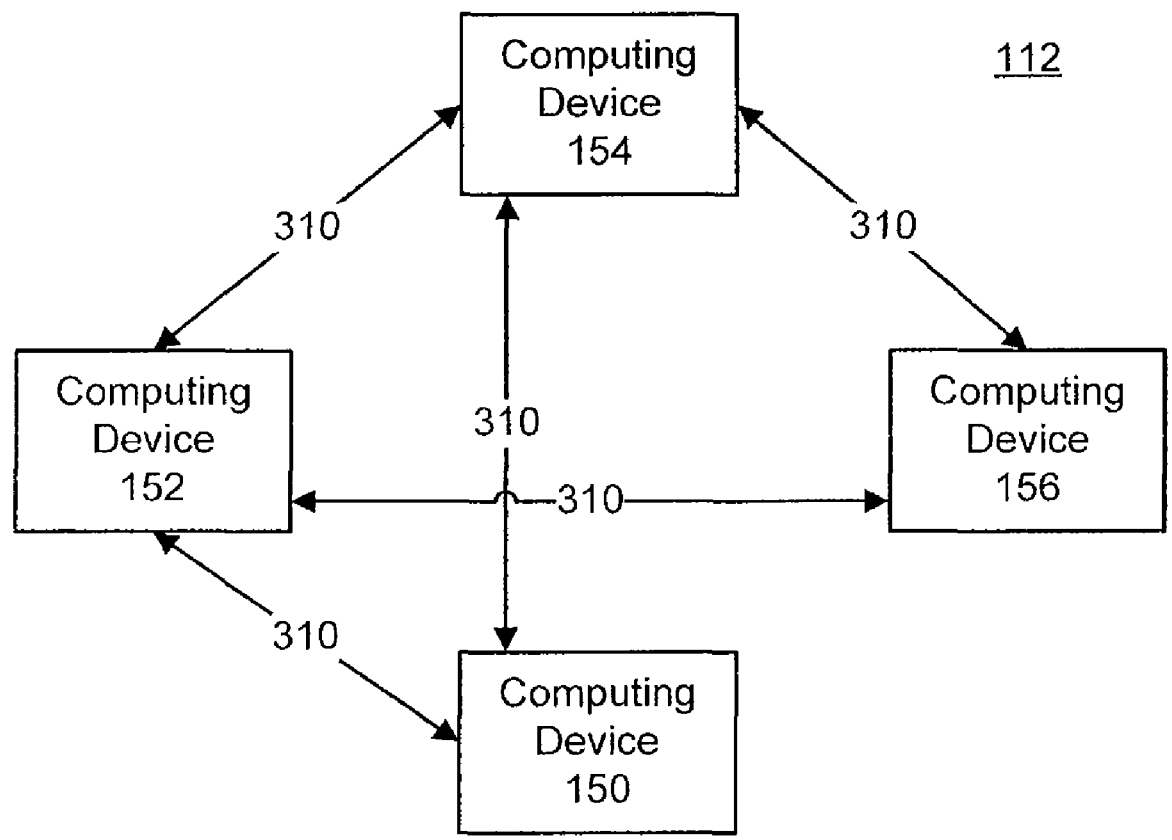
FIG. 3 is a graphical depiction of a conflict graph generated by a centralized controller based on detected conflicts within the network of FIG. 1.

Referring now to FIGS. 1 and 3, a conflict graph 112 generated by controller 110 based on detected conflicts within network 100 is shown, according to the exemplary embodiment of FIGS. 2A and 2B. Each link 310 indicates that packets simultaneously being transmitted to the computing devices joined by the link will result in a conflict and interference. Conflict graph 112 depicts that packets simultaneously sent by access points to computing devices 152 and/or 154 and any other computing device will result in a conflict. However, conflict graph 112 also depicts that packets may be simultaneously transmitted to computing devices 154 and 156. Referring to FIG. 2B, it can been seen that computing device 154 is not within range of wireless access point 144 and that computing device 156 is not within range of wireless access point 142, allowing simultaneous transmission without interference.

Conflict graph 112 may be stored in a data structure storing pairs of wireless access points and associated computing devices. Each data structure entry may be configured to include a listing of all pairs of wireless access points and associated computing devices that are in conflict with the current entry. Referencing the data structure may include providing a wireless access point and associated computing device pair and receiving a listing of all pairs of wireless access points and associated computing devices that are in conflict with provided pair.

Conflict graph 112 may be generated by controller 110 using any of a variety of methods. Exemplary methods include a bandwidth test, a passive measurement test and a micro-experiments test.

Using the bandwidth test, a simultaneous burst of traffic is transmitted along pairs of wireless access point link and computing device links. For example, a simultaneous burst may be transmitted to computing device 152 using wireless access point 142 and computing device 144 using wireless access point 144. The achieved throughput is compared to the throughput achieved by each link operating in isolation. If the throughput is lower, a conflict is assumed and a link 310 is added to graph 112.

Using the passive measurements test, each access point may be configured to continuously monitor received wireless transmission by other access points. For example, where a first access point can overhear a packet transmitted by a computing device, controller 110 may infer that all pairs of wireless access point and computing devices involving the first wireless access point and the computing device are in conflict. In this case, a link 310 is added between each device in communication with the first access point and the devices that can be overheard.

Using the micro-experiments test, controller 110 is configured to request transmission by two wireless access points to specifically designated computing devices. Based on the computing devices acknowledgements, controller 110 may infer the existence or absence of conflicts. For example, referring to FIG. 2A, controller 110 may request that wireless access point 142 transmit a data frame to computing device 150. At the same time a response is expected from device 150, may request that wireless access point 144 transmit a data frame to computing device 152. If a conflict exists, the acknowledgement from 150 will interfere with correct reception of the data from wireless access point 144 to computing device 152 and computing device 152 will not send an acknowledgement to wireless access point 144.

Conflict graph 112 may evolve periodically based on changes to the topology of network 100. For example, computing devices may join and dropout of network 100, computing devices may move relative to the access points, etc. Accordingly, controller 110 may be configured to update conflict graph 112 based on detected changes to network topology, based on an elapsed time, based on detect conflicts, etc.

Figure 4:
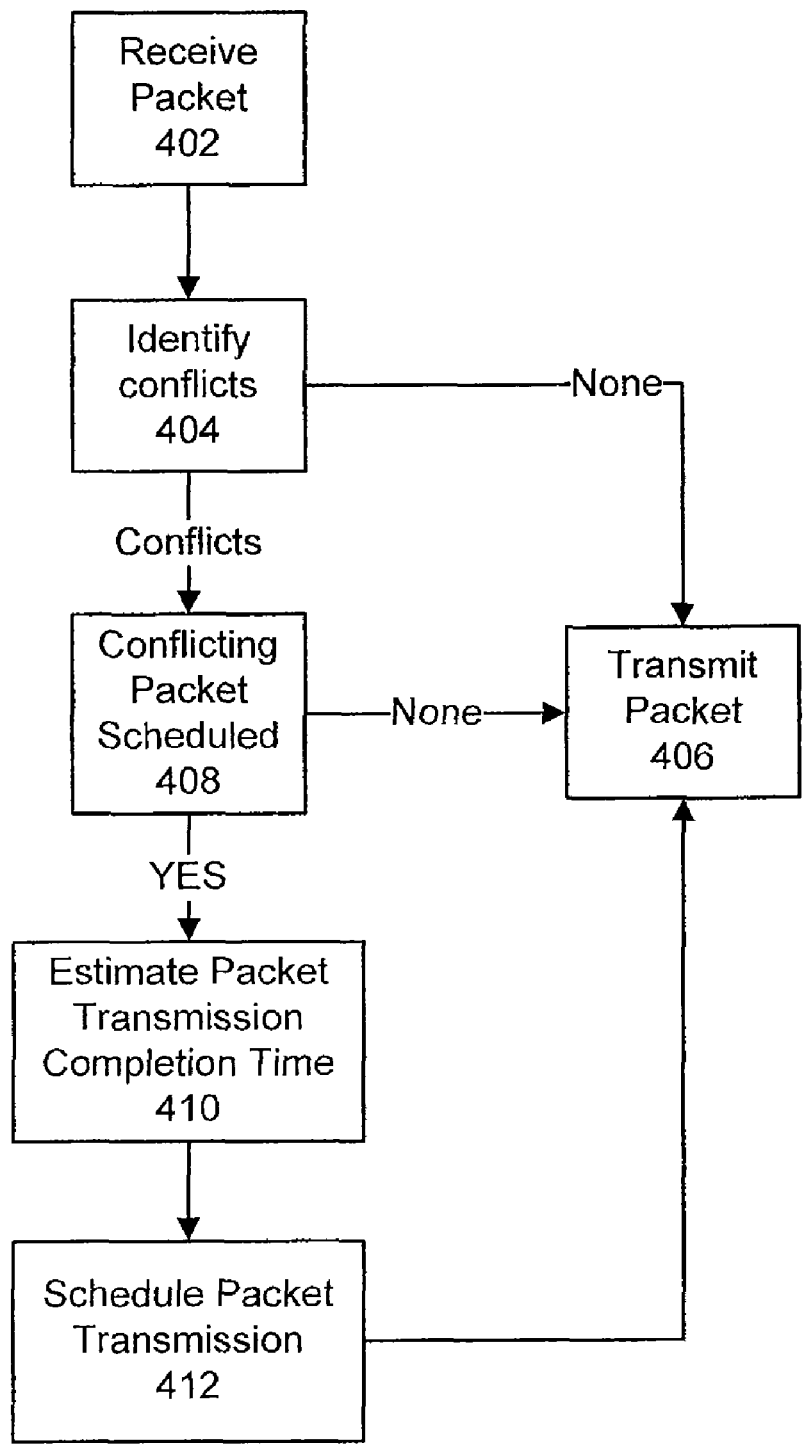
FIG. 4 is a flowchart depicting a method for providing packet scheduling in the centralized scheduling controller of FIG. 1.

Referring now to FIGS. 1 and 4, a flowchart 400 depicting a method for providing packet scheduling in the centralized scheduling system of FIG. 1 is shown, according to an exemplary embodiment. Scheduling may be implemented by the scheduler 114 in controller 110. Packets may be scheduled to be transmitted such that the total scheduling time for received packets is minimized with the constraint that any two packets that will be transmitted on interfering links should not be scheduled to be transmitted together. Scheduler 114 may further maximize throughput using speculative scheduling based on calculated completion times for packet transmissions that can be generated based on received an acknowledgement transmissions from the computing device indicating successful transmission. Scheduler 114 may also maximize throughput using epoch based transmittals wherein groups of packets are transmitted within defined time periods (epochs).

In a step 402, scheduler 114 may be configured to receive a packet for transmission. The packet may be downlink traffic received from external network 130 for transmission to any one of computing devices 150-156.

In a step 404 a determination is made using conflict graph 112, whether any potential conflicts exists. The determination may include providing the destination computing device and its associated wireless access point to the data structure including conflict graph 112.

If no conflicting pairs are returned, the packet may be transmitted in a step 406, relying on the distributed coordination function at the wireless access points 142 and 144. Transmitting packets may include using batch transmittals.

Packets may be transmitted in batches during designated time periods. The time duration of each transmittal time period may be configurable to be a larger time period having increased scheduling efficiency for the batch of packets and a smaller time period where individual packets may experience greater latency compared to individual transmission. A latency of greater than 5 ms has been found to provide good scheduling efficiency without introducing excessive individual packet latency.

In one exemplary embodiment, the wireless access points may be configured to utilize fixed backoff intervals (time before attempting retransmission after a wireless access point determines that a channel is currently being used) in order to increase the likelihood that future transmissions will occur concurrently for known exposed terminals. The backoff interval may be set to the distributed inter-frame space (DIFS)+ one half of the average amount of time terminals using DCF would spend in deferral (½ CW_min) in order to maintain fairness with the other contending 802.11 devices. The packets scheduled for the exposed terminals may be staggered by an amount of time to increase transmission concurrency as the packet transmissions may be synchronized due to the fixed backoff intervals. Because the transmissions are concurrent, no collision will be detected and both of the exposed terminals may transmit simultaneously without disabling carrier sensing at the access points.

If a conflict exists, a determination is made in a step 408 whether another packet has been previously scheduled but not yet transmitted that is associated with any of the pairs of wireless access points and destination computing devices. If not, packet transmission step 406 may be implemented.

If yes, scheduler 114 is configured to estimate the transmission completion time for the previously scheduled packet based on past history in a step 410. Transmission time may be estimated by accounting for two uncertainties in wireless transmission, uncertainty in wireless transmission time and uncertainty in wired transmission time. Controller 114 may be configured to receive data from wireless access points and also to measure its own transmission to and from the wireless access points to receive the historical data. The data may be classified based on various input factors such as packet size. Further, the data may be weighted based on recency such that earlier received data will have less of an impact in generating the estimate compared to more recent data. Transmission completion time may be estimated based on the received and/or measured historical data.

After the completion time is generated, the packet may be scheduled for transmission in a step 412 and transmitted in step 406. Scheduling the packet may include minimizing scheduling latencies by implementing a driver to driver communication path for the wireless access points to allow packets received on the wired network 115 to be immediately forwarded to the wireless interface, bypassing a kernel network queue typically implemented in the wireless access point. The scheduling may further include requesting and receiving a wired network acknowledgement that information controller 100 when a wireless access point has successfully transmitted a data packet.

Because the packet completion time generated in step 410 is an estimated time, there is potential for the packet to be transmitted before completion of the transmission of the previously scheduled packet. However, using normal packet transmission 406 including the distributed coordination function will perform back offs in the case of collisions.

Figure 5:
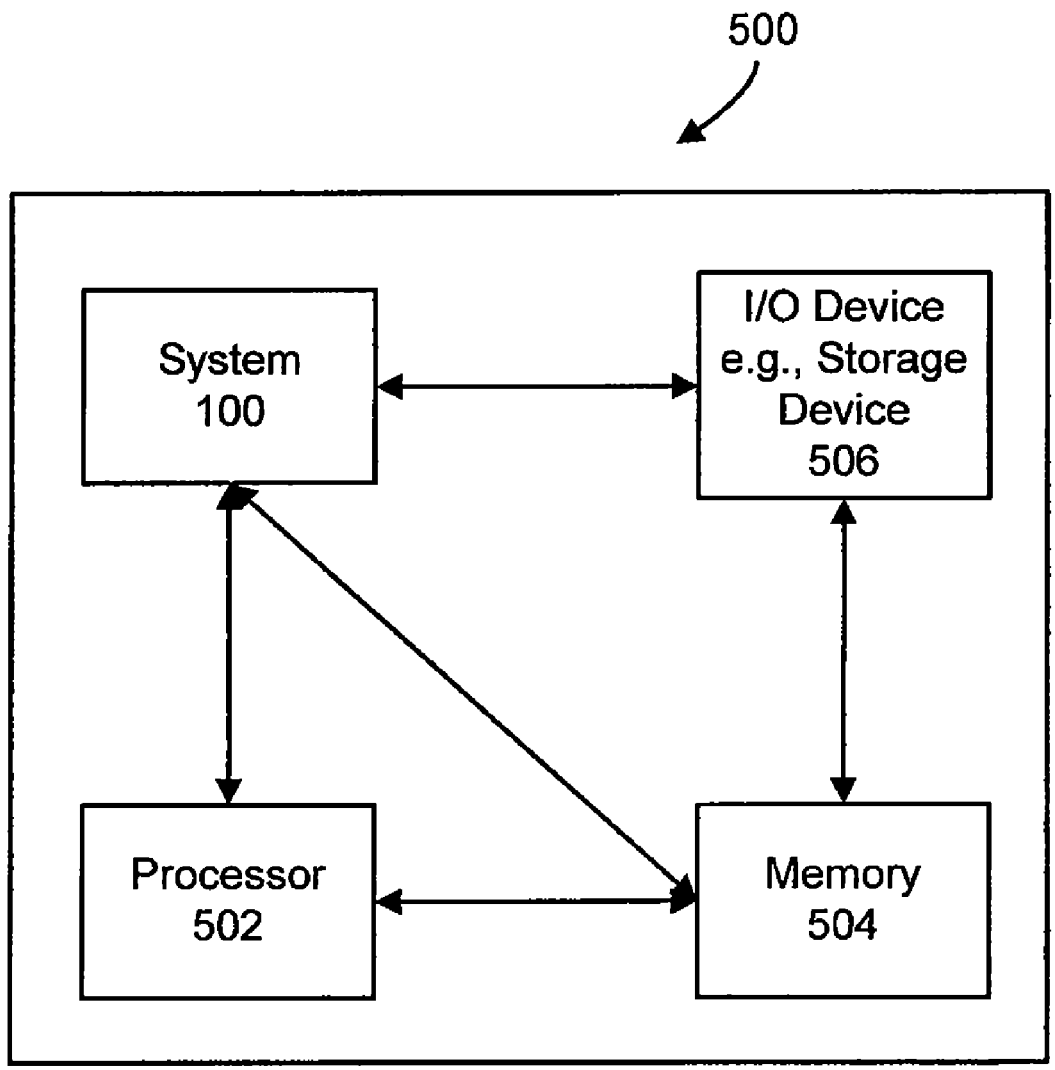
FIG. 5 is a high level block diagram of a computing system suitable for use in performing the functions of the centralized scheduling controller of FIG. 1.

FIG. 5 depicts a high level block diagram of a computing system 500 suitable for use in performing the functions described herein. According to an exemplary embodiment, system 500 may be integral to edge router 120. As depicted in FIG. 5, the system 500 comprises a processor element 502 (e.g., a CPU), a memory 504, e.g., random access memory (RAM) and/or read only memory (ROM), a module 100 for scheduling packets, and various input/output devices 506 (e.g., network interface cards, such as 10, 100, or Gigabit Ethernet NIC cards, Fibre Channel Host Bus Adapters, Infiniband adapters, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, or entirely in hardware, e.g., using application specific integrated circuits (ASIC), a general purpose computer or any other hardware equivalents. In one embodiment, the present module or process for scheduling packets can be loaded into memory 504 and executed by processor 502 to implement the functions as discussed above. As such, the present method for scheduling packets (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. For example, although the present invention is discussed herein in the context of Internet Protocol (IP) networks, the present invention may be applied to any packet based network including, but not limited to, cellular networks, Asynchronous Transfer Mode (ATM) networks, etc. For the purpose of scope, the term packet is intended to broadly include a data unit of any size or type, e.g., a record and the like. Thus, the breadth and scope of a preferred embodiment should not be limited by any of the above-described exemplary embodiments, but should be defined only in accordance with the following claims and their equivalents.

It is specifically intended that the present invention not be limited to the embodiments and illustrations contained herein, but include modified forms of those embodiments including portions of the embodiments and combinations of elements of different embodiments as come within the scope of the following claims.

We claim:

1. A computer-implemented method for scheduling a packet for transmission in a wireless local area network, comprising:
   receiving a packet from a router for forwarding to a wireless access point;
   determining whether the packet is to be transmitted to a computing device through a wireless access point that is in conflict with at least one other computing device associated with a different access point;
   determining whether there is a conflicting packet scheduled to be transmitted for any conflicting computing devices associated with a different access points;
   scheduling the packet for transmission based on any conflicting packets; and
   forwarding the packet to the wireless access point at the scheduled time,
   wherein determining whether there is a conflicting packet scheduled to be transmitted includes referencing the destination computing device and wireless access point pair in a conflict graph data structure.

2. The method of claim 1, wherein scheduling the packet for transmission includes scheduling the packet for transmission based on an estimated transmission completion for the conflicting packet.

3. The method of claim 2, wherein the estimated transmission completion is generated based on historical transmission times.

4. The method of claim 3, wherein the historical transmission times include average wireless transmission times generated by a wireless access point.

5. The method of claim 4, wherein the historical transmission times are weighted based on the recency of the measurement.

6. The method of claim 1, further including updating the conflict graph based on a detected change in the wireless network.

7. The method of claim 1, further including updating the conflict graph based on an elapsed time.

8. The method of claim 1, wherein scheduling the packet for transmission based on the conflict graph includes batch scheduling a plurality of received packets for transmission during a specified time period.

9. The method of claim 1, wherein scheduling the packet for transmission based on the conflict graph includes transmitting the packets to a wireless access point wireless interface.

10. A computer-readable non-transitory medium having stored thereon a plurality of instructions, the plurality of instructions including instructions which, when executed by a processor, cause the processor to perform the steps of a method for scheduling a packet for transmission in a wireless local area network, comprising:
    determining whether the packet is to be transmitted to a computing device through a wireless access point that is in conflict with at least one other computing device associated with a different access point;
    determining whether there is a conflicting packet scheduled to be transmitted for any conflicting computing devices associated with a different access points;
    scheduling the packet for transmission based on any conflicting packets; and
    forwarding the packet to a wireless access point at the scheduled time,
    wherein determining whether there is a conflicting packet scheduled to be transmitted includes referencing the destination computing device and wireless access point pair in a conflict graph data structure.

11. The computer-readable medium of claim 10, wherein scheduling the packet for transmission includes scheduling the packet for transmission based on an estimated transmission completion for the conflicting packet.

12. The computer-readable medium of claim 11, wherein the estimated transmission completion is generated based on historical transmission times.

13. The computer-readable medium of claim 12, wherein the historical transmission times include average wireless transmission times generated by a wireless access point.

14. The computer-readable medium of claim 13, wherein the historical transmission times are weighted based on the recency of the measurement.

15. The computer-readable medium of claim 10, further including updating the conflict graph based on a detected change in the wireless network.

16. The computer-readable medium of claim 10, wherein scheduling the packet for transmission based on the conflict graph includes batch scheduling a plurality of received packets for transmission during a specified time period.

17. The computer-readable medium of claim 10, wherein scheduling the packet for transmission based on the conflict graph includes transmitting the packets to a wireless access point wireless interface.

18. A system for scheduling a packet for transmission in a wireless local area network, comprising:
    an edge router configured to receive a plurality of downlink packets from an external network;
    a centralized scheduling controller configured to receive packets from the edge router for forwarding to one or more wireless access points, the controller including:
    a conflict graph data structure include a plurality of link pairs including a wireless access point and a computing device, each link pair including a listing of all other link pairs in the wireless local area network that are in conflict with the link pair;
    a scheduler for scheduling the received packets for transmission, the schedule configured to
    determine whether a packet is to be transmitted to a link pair that is in conflict with at least one other link pair using the conflict graph;
    determining whether there is a conflicting packet scheduled to be transmitted for any conflicting link pair; and
    scheduling the packet for transmission based on any conflicting packets.

19. The system of claim 18, further including at least one wireless access point configured to increase transmission concurrency with a second wireless access point using at least one of fixed backoff times and packet staggering where both wireless access points are indicated as exposed terminals in the conflict graph.

* * * * *